(12) United States Patent
Griffin et al.

(10) Patent No.: US 7,865,876 B2
(45) Date of Patent: Jan. 4, 2011

(54) MULTIPLE TRUSTED COMPUTING ENVIRONMENTS

(75) Inventors: Jonathan Griffin, Bristol (GB); Christopher I. Dalton, Bristol (GB); Michael Child, Bath (GB); Liqun Chen, Bristol (GB); Andrew Patrick Norman, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1676 days.

(21) Appl. No.: 10/175,542

(22) Filed: Jun. 18, 2002

(65) Prior Publication Data

US 2002/0194496 A1 Dec. 19, 2002

(30) Foreign Application Priority Data

Jun. 19, 2001 (GB) ................................. 0114891.5

(51) Int. Cl.
*G06F 9/44* (2006.01)
*G06F 9/455* (2006.01)
*H04L 9/32* (2006.01)

(52) U.S. Cl. .......................... 717/121; 717/126; 718/1; 718/100; 713/155; 713/156; 713/159; 713/164

(58) Field of Classification Search ......... 717/168–178, 717/126, 114, 121, 134, 151; 713/1–601; 709/226; 718/1, 100, 108
See application file for complete search history.

(56) References Cited

U.S. PATENT DOCUMENTS

| | | | | |
|---|---|---|---|---|
| 4,747,040 A | 5/1988 | Blanset et al. | ............... | 718/108 |
| 4,799,156 A | 1/1989 | Shavit et al. | ................... | 705/26 |
| 4,926,476 A | 5/1990 | Covey | ......................... | 713/164 |
| 4,962,533 A | 10/1990 | Kruger et al. | ............... | 711/163 |
| 4,984,272 A | 1/1991 | McIlroy et al. | ................. | 726/17 |
| 5,029,206 A | 7/1991 | Marino et al. | ............... | 713/164 |
| 5,032,979 A | 7/1991 | Hecht et al. | ................. | 364/200 |
| 5,038,281 A | 8/1991 | Peters | ......................... | 364/200 |
| 5,136,711 A | 8/1992 | Hugard et al. | .................. | 713/2 |
| 5,144,660 A | 9/1992 | Rose | .............................. | 380/4 |
| 5,261,104 A | 11/1993 | Bertram et al. | ................ | 713/1 |
| 5,278,973 A | 1/1994 | O'Brien et al. | .............. | 717/168 |

(Continued)

FOREIGN PATENT DOCUMENTS

CA 2 187 855 A 6/1997 ................... 296/56

(Continued)

OTHER PUBLICATIONS

U.S. Appl. No. 09/728,827, Proudler et al., filed Nov. 28, 2000.

(Continued)

*Primary Examiner*—Tuan Q Dam
*Assistant Examiner*—Isaac T Tecklu

(57) ABSTRACT

A computing platform 20 provides multiple computing environments 24 each containing a guest operating system 25 provided by a virtual machine application 26. Optionally, each computing environment 24 is formed in a compartment 220 of a compartmented host operating system 22. A trusted device 213 verifies that the host operating system 22 and each guest operating system 25 operates in a secure and trusted manner by forming integrity metrics which can be interrogated by a user 10. Each computing environment is isolated and secure, and can be verified as trustworthy independent of any other computing environment.

28 Claims, 6 Drawing Sheets

U.S. PATENT DOCUMENTS

| | | | |
|---|---|---|---|
| 5,325,529 A | 6/1994 | Brown et al. | 709/222 |
| 5,359,659 A | 10/1994 | Rosenthal | 380/4 |
| 5,361,359 A | 11/1994 | Tajalli et al. | 395/700 |
| 5,379,342 A | 1/1995 | Arnold et al. | 380/2 |
| 5,404,532 A | 4/1995 | Allen et al. | 395/700 |
| 5,410,707 A | 4/1995 | Bell | 713/2 |
| 5,414,860 A | 5/1995 | Canova et al. | 713/340 |
| 5,421,006 A | 5/1995 | Jablon et al. | 395/575 |
| 5,440,723 A | 8/1995 | Arnold et al. | 395/700 |
| 5,444,850 A | 8/1995 | Chang | 395/200.1 |
| 5,448,045 A | 9/1995 | Clark | 235/382 |
| 5,454,110 A | 9/1995 | Kannan et al. | 713/2 |
| 5,473,692 A | 12/1995 | Davis | 380/25 |
| 5,483,649 A | 1/1996 | Kuznetsov et al. | 726/22 |
| 5,495,569 A | 2/1996 | Kotzur | 714/2 |
| 5,497,490 A | 3/1996 | Harada et al. | 713/100 |
| 5,497,494 A | 3/1996 | Combs et al. | 713/323 |
| 5,504,814 A | 4/1996 | Miyahara | 713/164 |
| 5,504,910 A | 4/1996 | Wisor et al. | 713/322 |
| 5,530,758 A | 6/1996 | Marino et al. | 713/2 |
| 5,535,411 A | 7/1996 | Speed et al. | 713/2 |
| 5,548,763 A | 8/1996 | Combs et al. | 713/323 |
| 5,555,373 A | 9/1996 | Dayan et al. | 726/34 |
| 5,572,590 A | 11/1996 | Chess | 380/4 |
| 5,619,571 A | 4/1997 | Sandstrom et al. | 380/4 |
| 5,621,912 A * | 4/1997 | Borruso et al. | 718/1 |
| 5,680,452 A | 10/1997 | Shanton | 713/167 |
| 5,680,547 A | 10/1997 | Chang | 395/200.01 |
| 5,692,124 A | 11/1997 | Holden et al. | 726/2 |
| 5,694,590 A | 12/1997 | Thuraisingham et al. | 395/600 |
| 5,787,175 A | 7/1998 | Carter | 713/165 |
| 5,809,145 A | 9/1998 | Slik | 380/25 |
| 5,815,665 A | 9/1998 | Teper et al. | 395/200.59 |
| 5,841,869 A | 11/1998 | Merkling et al. | 713/164 |
| 5,844,986 A | 12/1998 | Davis | 380/4 |
| 5,845,068 A | 12/1998 | Winiger | 726/3 |
| 5,867,646 A | 2/1999 | Benson et al. | 395/186 |
| 5,887,163 A | 3/1999 | Nguyen et al. | 713/2 |
| 5,889,989 A | 3/1999 | Robertazzi et al. | 718/105 |
| 5,892,900 A * | 4/1999 | Ginter et al. | 726/26 |
| 5,903,732 A | 5/1999 | Reed et al. | 395/200.54 |
| 5,922,074 A | 7/1999 | Richard et al. | 726/21 |
| 5,933,498 A | 8/1999 | Schneck et al. | 705/504 |
| 5,960,177 A | 9/1999 | Tanno | 395/200.59 |
| 5,987,605 A | 11/1999 | Hill et al. | 713/2 |
| 5,987,608 A | 11/1999 | Roskind | 713/200 |
| 6,006,332 A | 12/1999 | Rabne et al. | 713/201 |
| 6,012,080 A | 1/2000 | Ozden et al. | 718/102 |
| 6,023,765 A | 2/2000 | Kuhn | 726/4 |
| 6,067,559 A | 5/2000 | Allard et al. | 709/202 |
| 6,078,948 A | 6/2000 | Podgorny et al. | 709/204 |
| 6,079,016 A | 6/2000 | Park | 713/2 |
| 6,081,830 A | 6/2000 | Schindler | 709/204 |
| 6,081,894 A | 6/2000 | Mann | 713/2 |
| 6,125,114 A | 9/2000 | Blanc et al. | 370/389 |
| 6,138,239 A | 10/2000 | Veil | 713/200 |
| 6,154,838 A * | 11/2000 | Le et al. | 713/2 |
| 6,157,719 A * | 12/2000 | Wasilewski et al. | 380/210 |
| 6,175,917 B1 | 1/2001 | Arrow et al. | 713/1 |
| 6,185,678 B1* | 2/2001 | Arbaugh et al. | 713/2 |
| 6,272,631 B1 | 8/2001 | Thomlinson et al. | 713/155 |
| 6,275,848 B1 | 8/2001 | Arnold | 709/206 |
| 6,289,462 B1 | 9/2001 | McNabb et al. | 713/201 |
| 6,292,900 B1 | 9/2001 | Ngo et al. | 713/200 |
| 6,304,970 B1 | 10/2001 | Bizzaro et al. | 726/2 |
| 6,327,652 B1* | 12/2001 | England et al. | 713/2 |
| 6,330,669 B1 | 12/2001 | McKeeth | 713/1 |
| 6,330,670 B1 | 12/2001 | England et al. | 713/2 |
| 6,334,118 B1 | 12/2001 | Benson | 713/167 |
| 6,367,012 B1 | 4/2002 | Atkinson et al. | 713/176 |
| 6,393,412 B1 | 5/2002 | Deep | 705/400 |
| 6,446,203 B1 | 9/2002 | Aguilar et al. | 713/2 |
| 6,449,716 B1 | 9/2002 | Rickey | 713/2 |
| 6,477,702 B1* | 11/2002 | Yellin et al. | 717/126 |
| 6,487,601 B1 | 11/2002 | Hubacher et al. | 709/229 |
| 6,496,847 B1 | 12/2002 | Bugnion et al. | 718/1 |
| 6,505,300 B2 | 1/2003 | Chan et al. | 713/164 |
| 6,513,156 B2 | 1/2003 | Bak et al. | 717/151 |
| 6,519,623 B1 | 2/2003 | Mancisidor | 718/100 |
| 6,530,024 B1 | 3/2003 | Proctor | 726/23 |
| 6,609,248 B1 | 8/2003 | Srivastava et al. | 717/147 |
| 6,622,018 B1* | 9/2003 | Erekson | 455/420 |
| 6,671,716 B1 | 12/2003 | Diedrichsen et al. | 709/203 |
| 6,681,304 B1 | 1/2004 | Vogt et al. | 711/164 |
| 6,701,440 B1 | 3/2004 | Kim et al. | 726/24 |
| 6,732,276 B1 | 5/2004 | Cofler et al. | 713/200 |
| 6,751,680 B2 | 6/2004 | Langerman et al. | 710/3 |
| 6,757,824 B1* | 6/2004 | England | 713/156 |
| 6,775,779 B1 | 8/2004 | England et al. | 713/200 |
| 6,854,114 B1* | 2/2005 | Sexton et al. | 718/1 |
| 6,892,307 B1 | 5/2005 | Wood et al. | 726/8 |
| 6,931,545 B1 | 8/2005 | Ta et al. | 713/156 |
| 6,948,069 B1 | 9/2005 | Teppler | 713/178 |
| 6,965,816 B2 | 11/2005 | Walker | 701/16 |
| 6,988,250 B1* | 1/2006 | Proudler et al. | 716/1 |
| 7,194,623 B1* | 3/2007 | Proudler et al. | 713/164 |
| 2001/0037450 A1* | 11/2001 | Metlitski et al. | 713/152 |
| 2002/0012432 A1 | 1/2002 | England et al. | 380/231 |
| 2002/0023212 A1* | 2/2002 | Proudler | 713/164 |
| 2002/0069354 A1* | 6/2002 | Fallon et al. | 713/2 |
| 2002/0120575 A1* | 8/2002 | Pearson et al. | 705/51 |
| 2002/0184486 A1 | 12/2002 | Kershenbaum et al. | 713/150 |
| 2002/0184520 A1* | 12/2002 | Bush et al. | 713/200 |
| 2002/0188935 A1* | 12/2002 | Hertling et al. | 717/170 |
| 2003/0084436 A1 | 5/2003 | Berger et al. | 717/174 |
| 2003/0145235 A1 | 7/2003 | Choo | 713/201 |
| 2003/0191957 A1 | 10/2003 | Hypponen et al. | 713/200 |
| 2003/0196083 A1* | 10/2003 | Grawrock et al. | 713/156 |
| 2003/0196110 A1* | 10/2003 | Lampson et al. | 713/156 |
| 2004/0045019 A1* | 3/2004 | Bracha et al. | 719/332 |
| 2004/0148514 A1* | 7/2004 | Fee et al. | 713/200 |
| 2005/0256799 A1 | 11/2005 | Warsaw et al. | 705/37 |

FOREIGN PATENT DOCUMENTS

| | | | |
|---|---|---|---|
| EP | 0 304 033 A | 2/1989 | |
| EP | 0 421 409 A2 | 4/1991 | |
| EP | 0 510 244 A1 | 10/1992 | |
| EP | 0 580 350 A1 | 1/1994 | |
| EP | 0 825 511 A | 2/1998 | 380/25 |
| EP | 0 849 657 A | 6/1998 | 713/200 |
| EP | 0 849 680 A2 | 6/1998 | 395/187 |
| EP | 0 465 016 | 12/1998 | |
| EP | 0 893 751 A1 | 1/1999 | 131/336 |
| EP | 0 895 148 A | 2/1999 | |
| EP | 0 926 605 A1 | 6/1999 | 709/229 |
| EP | 0 992 958 A2 | 4/2000 | 702/189 |
| EP | 1 056 014 A1 | 8/2000 | |
| EP | 1030237 | 8/2000 | |
| EP | 1 049 036 A2 | 11/2000 | 427/302 |
| EP | 1 055 990 A1 | 11/2000 | |
| EP | 1 056 010 A1 | 11/2000 | |
| EP | 1 076 279 A1 | 2/2001 | 478/515 |
| EP | 1 107 137 A2 | 6/2001 | 379/264 |
| GB | 2 317 476 A | 3/1998 | 353/50 |
| GB | 2 336 918 A | 11/1999 | |
| GB | 00204412 | 8/2000 | |
| GB | 2 353 885 A1 | 3/2001 | |
| GB | 2 361 153 A | 10/2001 | 417/466 |
| WO | 93/25024 A | 12/1993 | |
| WO | 94/11967 A1 | 5/1994 | |
| WO | 95/24696 A | 9/1995 | 24/400 |
| WO | 95/27249 A | 10/1995 | |
| WO | 97/29416 A2 | 8/1997 | |

| | | | | |
|---|---|---|---|---|
| WO | 98/15082 | A | 4/1998 | ........... 380/4 |
| WO | 98/26529 | | 6/1998 | |
| WO | 98/36517 | A | 8/1998 | ........... 395/166 |
| WO | 98/40809 | A2 | 9/1998 | |
| WO | 98/44402 | | 10/1998 | |
| WO | 98/45778 | A | 10/1998 | |
| WO | 00/16200 | A | 3/2000 | |
| WO | 00/19324 | A1 | 4/2000 | ........... 872/204 |
| WO | 00/31644 | | 6/2000 | |
| WO | 00/48062 | | 8/2000 | |
| WO | 00/48063 | | 8/2000 | |
| WO | 00/52900 | A1 | 9/2000 | |
| WO | 00/54125 | | 9/2000 | |
| WO | 00/54126 | | 9/2000 | |
| WO | 00/58859 | | 10/2000 | |
| WO | 00/73880 | | 12/2000 | |
| WO | 00/73904 | | 12/2000 | |
| WO | 00/73904 | A | 12/2000 | |
| WO | 00/73913 | A1 | 12/2000 | |
| WO | 01/09781 | A2 | 2/2001 | |
| WO | 01/13198 | | 2/2001 | |
| WO | 01/23980 | A1 | 4/2001 | |
| WO | 01/27722 | A1 | 4/2001 | |
| WO | 01/42889 | A | 6/2001 | |
| WO | 01/65334 | A2 | 9/2001 | |
| WO | 01/65366 | A1 | 9/2001 | |

OTHER PUBLICATIONS

U.S. Appl. No. 09/920,554, Proudler, filed Aug. 1, 2001.
U.S. Appl. No. 10/075,444, Brown et al., filed Feb. 15, 2002.
U.S. Appl. No. 10/080,466, Pearson et al., filed Feb. 22, 2002.
U.S. Appl. No. 10/165,840, Dalton, filed Jun. 7, 2002.
U.S. Appl. No. 10/175,183, Griffin et al., filed Jun. 18, 2002.
U.S. Appl. No. 10/175,185, Pearson et al., filed Jun. 18, 2002.
U.S. Appl. No. 10/175,395, Pearson et al., filed Jun. 18, 2002.
U.S. Appl. No. 10/175,553, Griffin et al., filed Jun. 18, 2002.
U.S. Appl. No. 10/206,812, Proudler, filed Jul. 26, 2002.
U.S. Appl. No. 10/240,137, Dalton et al., filed Sep. 26, 2002.
U.S. Appl. No. 10/240,139, Choo et al., filed Sep. 26, 2002.
U.S. Appl. No. 10/303,690, Proudler et al., filed Nov. 21, 2002.
Burke, J.P., "Security Suite Gives Sniffer Programs Hay Fever," *HP Professional* vol. 8, No. 9, 3 pages total (Sep. 1994).
Anderson, R., et al., "Tamper Resistance—a Cautionary Note," *ISENIX Association, Second USENIX Workshop on Electronic Commerce*, pp. 1-11 (Nov. 18-21, 1996).
Berger, J.L., et al., "Compartmented Mode Workstation: Prototype Highlights," *IEEE Transactions on Software Engineering*, vol. 16, No. 6 (Jun. 1990).
Chaum, D., "Security without Identification: Transaction Systems to Make Big Brother Obsolete," *Communications of the ACM*, vol. 28, No. 10, pp. 1030-1044 (Oct. 1985).
Choo, T.H., et al., "Trusted Linux: A Secure Platform for Hosting Compartmented Applications," *Enterprise Solutions*, pp. 1-14 (Nov./Dec. 2001).
Dalton, C., et al., "An operating system approach to securing e-services," *Communications of the ACM*, vol. 44, Issue 2 (Feb. 2001).
Dalton, C., et al., "Applying Military Grade Security to the Internet," *Computer Networks and ISND Systems*, vol. 29, pp. 1799-1808 (1997).
Dalton, C.I., et al., "Design of secure UNIX," *Elsevier Information Security Report*, (Feb. 1992).
Hallyn, S.E., et al., "Domain and Type Enforcement for Linux," Internet: <http://www.usenix.org/publications/library/proceedings/als2000/full_papers/hallyn/hallyn_html/>. (Retrieved Apr. 24, 2002).
Loscocco, P., et al., "Integrating Flexible Support for Security Policies into the Linux Operating System," Internet: <www.nsa.gov/selinux> (Retrieved Apr. 24, 2002).
Milojicic, D. et al., "Process Migration," Internet: <http://www.hpl.hp.com/techreports/1999/HPL-1999-21.html.> pp. 1-48 (Dec. 5, 1998).

Senie, D., "Using the SOCK_PACKET mechanism in Linux to gain complete control of an Ethernet Interface," Internet: <http://www.senie.com/dan/technology/sock_packet.html>. (Retrieved Apr. 24, 2002).
Wiseman, S., et al., "The Trusted Path between SMITE and the User," *Proceedings 1988 IEEE Symposium on Security and Privacy*, pp. 147-155 (Apr. 18-21, 1988).
Yee, B., "Using Secure Coprocessors," Doctoral thesis—Carnegie Mellon University, pp. 1-94 (May 1994).
*Boot Integrity Services Application Programming Interface*, Version 1.0, Intel Corporation, pp. 1-60 (Dec. 28, 1998).
"Building a Foundation of Trust in the PC," *Trusted Computing Platform Alliance*, pp. 1-7 (Jan. 2000).
"HP Virtualvault: Trusted Web-server Platform Product Brief," Internet: <http://www.hp.com/security/products/virtualvault/papers/brief_4.0/> pp. 1-6.
"Information technology—Security techniques—Entity authentication; Part 3: Mechanisms using digital signature techniques," *ISO/IEC 9798-3*, Second Edition, pp. 1-6 (1998).
"Information technology—Security techniques—Key management—Part 3: Mechanisms using asymmetric techniques," *ISO/IEC 11770-3*, pp. 1-34 (1999).
"NIST Announces Technical Correction to Secure Hash Standard," Internet: <http://www.nist.gov/public_affairs/releases/hashstan.htm> pp. 1-2 (Oct. 24, 2002).
"Norton AntiVirus 5.0 Delux," *PC Magazine Online; The 1999 Utility Guide: Desktop Antivirus*, pp. 1-2, Internet: <http://www.zdnet.com/pcmag/features/utilities99/deskav07.html> (Retrieved Nov. 30, 2001).
"Secure Computing with JAVA™: Now and the Future," Internet: <http://java.sun.com/marketing/collateral/security.html> pp. 1-29 (Apr. 2, 2002).
"Secure Execution Environments, Internet Safety through Type-Enforcing Firewalls," Internet: <thp://www.ghp.com/research/nailabs/secure-execution/internet-safety.asp> (Retrieved Apr. 24, 2002).
*Sophos Anti-Virus for Notes/Domino Release Notes*, Version 2.0, pp. 1-2, Internet: <http://www.sophos.com/sophos/products/full/readmes/readnote.txt> (Retrieved Nov. 30, 2001).
Trusted Computing Platform Alliance, Main Specification Version 1.0, 284 pages (Jan. 25, 2001).
Ford, B., et al., "Microkernels Meet Recursive Virtual Machines", Operating Systems Review, ACM, vol. 30, No. Special Issue, pp. 137-151 (Dec. 21, 1996).
Goldberg, R.P., "Survey of Virtual Machine Research", Computer, IEEE Service Center, vol. 7, No. 6, pp. 34-45 (Jun. 1974).
Popek, G. J., "Formal Requirements for Virtualizable Third Generation Architectures", Communications of the Association for Computing Machinery, ACM, vol. 17, No. 7, pp. 412-421 (Jul. 1974).
Spalka, A., et al., "Protecting the Creation of Digital Signatures with Trusted Computing Platform Technology Against attack by Trojan Horses," pp. 403-419 International Conference: Proceedings ISC (Jun. 11, 2001).
U.S. Appl. No. 09/979,902, Proudler, et al., filed Nov. 27, 2001.
U.S. Appl. No. 09/979,903, Proudler, et al., filed Nov. 27, 2001.
U.S. Appl. No. 10/080,476, Proudler, et al., filed Feb. 22, 2002.
U.S. Appl. No. 10/080,477, Brown, et al., filed Feb. 15, 2002.
U.S. Appl. No. 10/080,478, Pearson, et al., filed Feb. 22, 2002.
U.S. Appl. No. 10/080,479, Pearson, et al., filed Feb. 22, 2002.
U.S. Appl. No. 10/194,831, Chen, et al., filed Jul. 11, 2002.
U.S. Appl. No. 10/208,718, Chen, et al., filed Jul. 29, 2002.
U.S. Appl. No. 10/240,138, Choo, filed Sep. 26, 2002.
Barkley, J., et al., "Managing Role/Permission Relationships Using Object Access Types," ACM, pp. 73-80, Jul. 1998, retrieved Jun. 25, 2005.
Bontchev, V., "Possible Virus Attacks Against Integrity Programs and How to Prevent Them," Virus Bulletin Conference, pp. 131-141 (Sep. 1992).
Grimm, R., et al., "Separating Access Control Policy, Enforcement, and Functionality in Extensible Systems," ACM pp. 36-70, Feb. 2001, retrieved Jun. 25, 2005.
Jaeger, T., et al., "Requirements of Role-Based Access Control for Collaborative Systems," ACM, pp. 53-64, Dec. 1996, retrieved Jun. 25, 2005.

Naor, M., et al., "Secure and Efficient Metering," Internet: <http://citeseer.nj.com/naor98secure.html> Sections 1-1.3 (1998).

P.C Magazine Online; The 1999 Utility Guide: Desktop Antivirus; Norton Antivirus 5.0 DeLux, Internet.

Radai, Y., "Checksumming Techniques for Anti-Viral Purposes," Virus Bulletin Conference, pp. 39-68 (Sep. 1991).

Schneck, P.B., "Persistent Access Control to Prevent Piracy of Digital Information," *Proceedings of the IEEE*, vol. 87, No. 7, pp. 1239-1250 (Jul. 1999).

"System for Detecting Undesired Alteration of Software," IBM Technical Bulletin, vol. 32, No. 11 pp. 48-50 (Apr. 1990).

The Trusted Computing Platform Alliance, "Building Foundation of Trust in the PC,", 9 pages, located at Internet address <www.trustedpc.org/home/home.html.> (Jan. 2000).

Zhang, N.X., et al., "Secure Code Distribution," pp. 76-79, 1997 IEEE, retrieved Jun. 25, 2005.

* cited by examiner

MULTIPLE TRUSTED COMPUTING ENVIRONMENTS

CROSS REFERENCE TO RELATED APPLICATIONS

The subject matter of the present application may also be related to the following U.S. Patent Applications: "Operation of Trusted State in Computing Platform," Ser. No. 09/728,827, filed Nov. 28, 2000; "Performance of a Service on a Computing Platform," Ser. No. 09/920,554, filed Aug. 1, 2001; "Secure E-Mail Handling Using a Compartmented Operating System," Ser. No. 10/075,444, filed Feb. 15, 2002; "Electronic Communication," Ser. No. 10/080,466, filed Feb. 22, 2002; "Demonstrating Integrity of a Compartment of a Compartmented Operating System," Ser. No. 10/165,840, filed Jun. 7, 2002; "Multiple Trusted Computing Environments with Verifiable Environment Entities," Ser. No. 10/175,183, filed Jun. 18, 2002; "Renting a Computing Environment on a Trusted Computing Platform," Ser. No. 10/175,185, filed Jun. 18, 2002; "Interaction with Electronic Services and Markets," Ser. No. 10/175,395, filed Jun. 18, 2002; "Performing Secure and Insecure Computing Operations in a Compartmented Operating System," Ser. No. 10/175,553, filed Jun. 18, 2002; "Privacy of Data on a Computer Platform," Ser. No. 10/206,812, filed Jul. 26, 2002; "Trusted Operating System," Ser. No. 10/240,137, filed Sep. 26, 2002; "Trusted Gateway System," Ser. No. 10/240,139, filed Sep. 26, 2002; and "Apparatus and Method for Creating a Trusted Environment," Ser. No. 10/303,690, filed Nov. 21, 2002.

The present invention relates in general to a method for providing multiple computing environments running on a single host computing platform, and relates to a method for verifying integrity of the computing environments.

It is desired to run multiple applications on a single host computing platform such as a server. It is known to provide a separate logically distinct computing environment for each application. However, a problem arises when one application or its environment is incompatible with another application, or is not considered trusted by another application.

An aim of the present invention is to provide a method that allows multiple computing environments to be provided on a single host computing platform. A preferred aim is to provide a high degree of isolation between the multiple computing environments. Another preferred aim is to provide a method for verifying integrity of one computing environment independently of any other of the computing environments, such that each environment is independently trustworthy.

According to a first aspect of the present invention there is provided a method for providing a trusted computing environment, comprising the steps of: (a) providing a host operating system; (b) obtaining an integrity metric for the host operating system; (c) providing a computing environment including a guest operating system; and (d) obtaining an integrity metric for the computing environment.

Preferably, the step (b) includes obtaining the integrity metric during boot of the host operating system. Preferably, the step (b) includes obtaining an integrity metric for a BIOS and/or an OS loader and/or an operating system software of the host operating system. Preferably, the step (b) includes obtaining the integrity metric by performing data event logging, and/or by performing a hash function to all or selected data files associated with the host operating system. Preferably, the step (b) comprises updating at least part of the integrity metric for the host operating system.

Additionally, the step (d) comprises obtaining an integrity metric of the guest operating system. Suitably, the step (c) comprises providing a virtual machine application running on the host operating system for providing the guest operating system. Preferably, the step (d) comprises obtaining an integrity metric of the virtual machine application. Further, the step (c) comprises providing a process running on the guest operating system. Preferably, the step (d) comprises obtaining an integrity metric of the process.

In the preferred embodiments of the invention, the step (c) comprises providing the computing environment in a compartment of the host operating system. Preferably, the host operating system is a compartmented operating system. Suitably, the compartment confines the guest operating system. It is preferred that the step (d) comprises obtaining an integrity metric from a history of all processes launched in the compartment.

Preferably, the step (d) comprises updating at least part of the integrity metric for the computing environment. Preferably, the step (b) comprises storing the integrity metric for the host operating system, and/or the step (d) comprises storing the integrity metric for the computing environment. Preferably, the integrity metric for the computing environment is stored associated with an identity of the computing environment.

Preferably, the step (b) and/or the step (d) comprises obtaining the integrity metric using a trusted device, and storing the integrity metric in a platform configuration register of the trusted device. Preferably, the integrity metric for the computing environment is stored in a platform configuration register or group of platform configuration registers associated with the computing environment.

Additionally, the method preferably comprises the step of verifying the trusted computing environment including the steps of: (e) identifying the computing environment; (f) supplying the integrity metric for the host operating system; and (g) supplying the integrity metric for the computing environment.

Although the present invention has been introduced above in terms of a single computing environment, preferably a plurality of computing environments are provided on a single host computing platform. Suitably, the step (c) comprises providing a plurality of computing environments each including a guest operating system, and the step (d) comprises obtaining an integrity metric of each computing environment.

According to a second aspect of the present invention there is provided a method for verifying integrity of a trusted computing environment amongst many on a single host computing platform running a host operating system, each computing environment comprising a guest operating system running on the host operating system, the method comprising the steps of: (a) identifying the computing environment; (b) supplying an integrity metric of the host operating system; and (c) supplying an integrity metric associated with the identified computing environment.

Preferably, the step (a) comprises receiving identity information associated with the computing environment, such as receiving information about a process running in a computing environment, and determining the computing environment which contains that process.

According to a third aspect of the present invention there is provided a computing platform, comprising: a host operating system; a plurality of computing environments each comprising a guest operating system running on the host operating system; and a trusted device for obtaining an integrity metric of the host operating system and an integrity metric of each computing environment.

Preferably, the trusted device stores the integrity metric for the host operating system and the integrity metric for each guest operating system. Preferably, the trusted device stores each integrity metric in a platform configuration register or a group of platform configuration registers. Preferably, the trusted device allocates a platform configuration register or group of platform configuration registers to each computing environment.

For a better understanding of the invention, and to show how embodiments of the same may be carried into effect, reference will now be made, by way of example, to the accompanying diagrammatic drawings in which.

Figure 1:
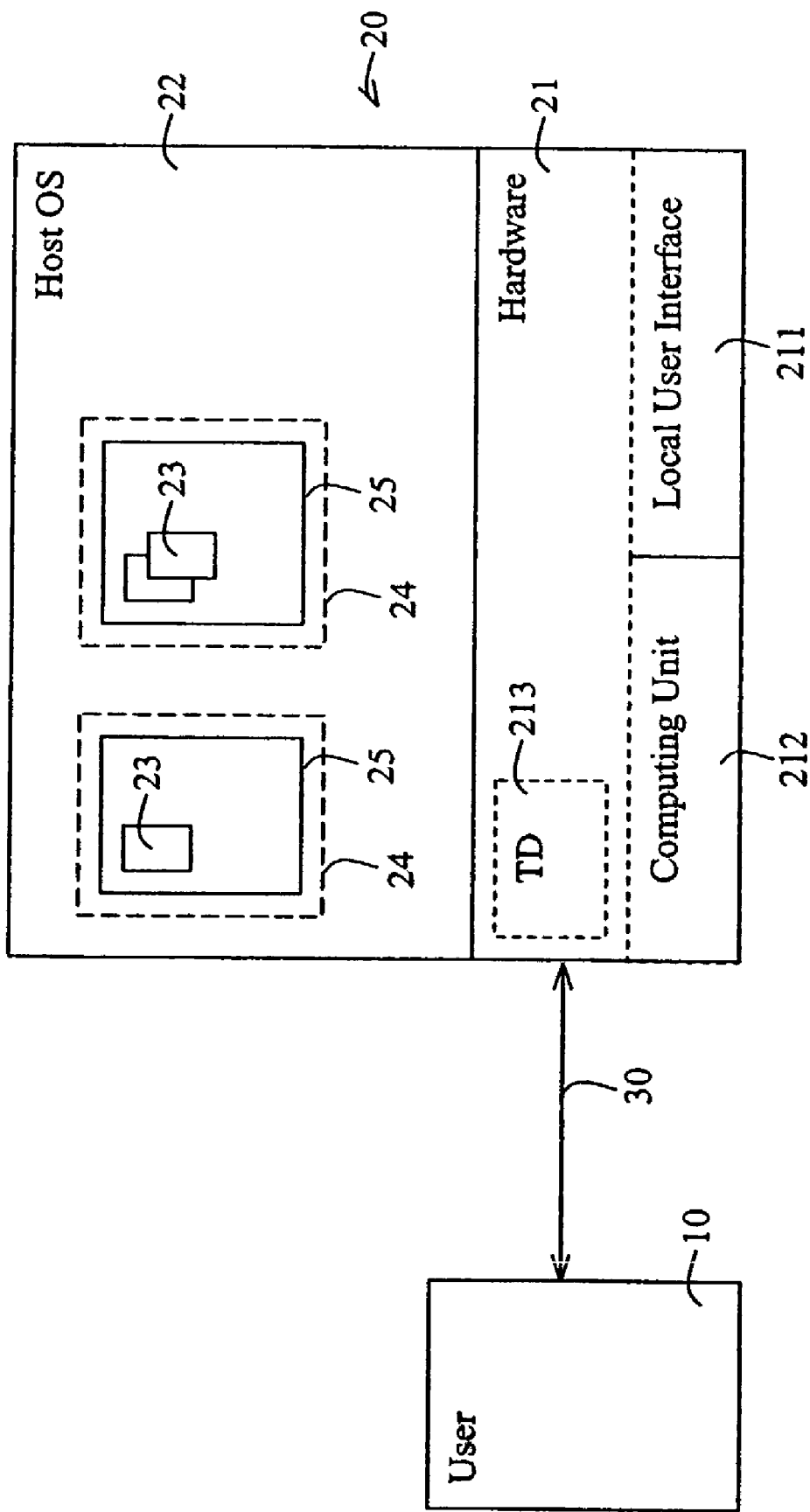
FIG. 1 shows a preferred computing platform.

FIG. 1 shows a computing platform 20 employed in preferred embodiments of the present invention. The computing platform 20 comprises hardware 21 operating under the control of a host operating system 22. The hardware 21 may include standard features such as a keyboard, a mouse and a visual display unit which provide a physical user interface 211 to a local user of the computing platform. The hardware 21 also suitably comprises a computing unit 212 comprising a main processor, a main memory, an input/output device and a file storage device which together allow the performance of computing operations. Other parts of the computing platform are not shown, such as connections to a local or global network. This is merely one example form of computing platform and many other specific forms of hardware are applicable to the present invention.

In the preferred embodiment the hardware 21 includes a trusted device 213. The trusted device 213 is suitably a physical component such as an application specific integrated circuit (ASIC). Preferably the trusted device is mounted within a tamper-resistant housing. The trusted device 213 is coupled to the computing unit 212, and ideally to the local user interface unit 211. The trusted device 213 is preferably mounted on a motherboard of the computing unit 212. The trusted device 213 functions to bind the identity of the computing platform 20 to reliably measured data that provides an integrity metric of the platform.

Preferably, the trusted device 213 performs a secure boot process when the computing platform 20 is reset to ensure that the host operating system 22 of the platform 20 is running properly and in a secure manner. During the secure boot process, the trusted device 213 acquires an integrity metric (or a group of integrity metrics) of the computing platform 20, such as by examining operation of the computing unit 212 and the local user interface unit 211. The integrity metrics are then available for a user to determine whether to trust the computing platform to operate is a predicted manner. In particular, a trusted computing platform is expected not to be subject to subversion such as by a virus or by unauthorised access. The user includes a local user of the computing platform, or a remote user communicating with the computing platform by networking (including LAN, WAN, internet and other forms of networking).

WO 00/48063 (Hewlett-Packard) discloses an example computing platform suitable for use in preferred embodiments of the present invention. In this example the trusted device 213 acquires a hash of a BIOS memory of the computing unit 212 after reset. The trusted device 213 receives memory read signals from the main processor and returns instructions for the main processor to form the hash. The hash is stored in the trusted device 213, which then returns an instruction that calls the BIOS program and a boot procedure continues as normal.

Preferably, the trusted device 213 controls the local user interface 211 such that a local user can trust the display of data provided on a visual display unit. WO 00/73913 (Hewlett-Packard) discloses an example system for providing a trustworthy user interface by locating a driver for the visual display unit within the trusted device 213.

The hardware 21 may also comprise a trusted user interface for performing secure communication with a user device such as a smart card held by the user. The trusted user interface allows the user to perform trusted communications with the trusted device 213 in order to verify the integrity of the computing platform 20. The use of a smart card or other token for trusted user interaction is described in more detail in WO 00/54125 (Hewlett-Packard) and WO 00/54126 (Hewlett-Packard).

FIG. 1 shows a user 10 such as a remote client which is arranged to communicate with the computing platform 20, preferably over a secure channel 30. The secure channel 30 is protected, for example, using a shared session key, which is a secret which is known only to the computing platform 20 and the user 10. Providing a secure channel including generation of a shared session key will be familiar to the person skilled in the art. Ideally, the user 10 performs an integrity challenge to confirm that communication is made with an expected computing platform 20, using a signature provided by the trusted device 213. However, any suitable authentication can be employed.

The computing platform 20 provides a computing environment 24 which gives access to resources of the computing platform, such as processor time, memory area, and filespace. Preferably, a plurality of discrete computing environments 24 are provided. Each computing environment is logically distinct, but shares access to at least some of the resources of the computing platform with other computing environments.

Suitably, the computing environment 24 comprises a compartment. The actions or privileges within a compartment are constrained, particularly to restrict the ability of a process to execute methods and operations which have effect outside the compartment, such as methods that request network access or access to files outside of the compartment. Also, operation of the process within the compartment is performed with a high level of isolation from interference and prying by outside influences.

Preferably, the compartment is an operating system compartment controlled by a kernel of the host operating system 22. This is also referred to as a compartmented operating system or a trusted operating system.

Compartmented operating systems have been available for several years in a form designed for handling and processing classified (military) information, using a containment mechanism enforced by a kernel of the operating system with mandatory access controls to resources of the computing platform such as files, processes and network connections. The operating system attaches labels to the resources and enforces a policy which governs the allowed interaction between these resources based on their label values. Most compartmented operating systems apply a policy based on the Bell-LaPadula model discussed in the paper "Applying Military Grade Security to the Internet" by C I Dalton and J F Griffin published in Computer Networks and ISDN Systems 29 (1997) 1799-1808.

The preferred embodiment of the present invention adopts a simple and convenient form of operating system compartment. Each resource of the computing platform which it is desired to protect is given a label indicating the compartment to which that resource belongs. Mandatory access controls are performed by the kernel of the host operating system to ensure that resources from one compartment cannot interfere with resources from another compartment. Access controls can follow relatively simple rules, such as requiring an exact match of the label.

Examples of resources include data structures describing individual processes, shared memory segments, semaphores, message queues, sockets, network packets, network interfaces and routing table entries.

Communication between compartments is provided using narrow kernel level controlled interfaces to a transport mechanism such as TCP/UDP. Access to these communication interfaces is governed by rules specified on a compartment by compartment basis. At appropriate points in the kernel, access control checks are performed such as through the use of hooks to a dynamically loadable security module that consults a table of rules indicating which compartments are allowed to access the resources of another compartment. In the absence of a rule explicitly allowing a cross compartment access to take place, an access attempt is denied by the kernel. The rules enforce mandatory segmentation across individual compartments, except for those compartments that have been explicitly allowed to access another compartment's resources. Communication between a compartment and a network resource is provided in a similar manner. In the absence of an explicit rule, access between a compartment and a network resource is denied.

Suitably, each compartment is allocated an individual section of a file system of the computing platform. For example, the section is a chroot of the main file system. Processes running within a particular compartment only have access to that section of the file system. Through kernel controls, the process is restricted to the predetermined section of file system and cannot escape. In particular, access to the root of the file system is denied.

Advantageously, a compartment provides a high level of containment, whilst reducing implementation costs and changes required in order to implement an existing application within the compartment.

Referring to FIG. 1, it is desired to run a process 23 in one of the computing environments 24. In practical embodiments, many processes run on the computing platform simultaneously. Some processes are grouped together to form an application or service. For simplicity, a single process will be described first, and the invention can then be applied to many processes and to groups of processes.

Figure 2:
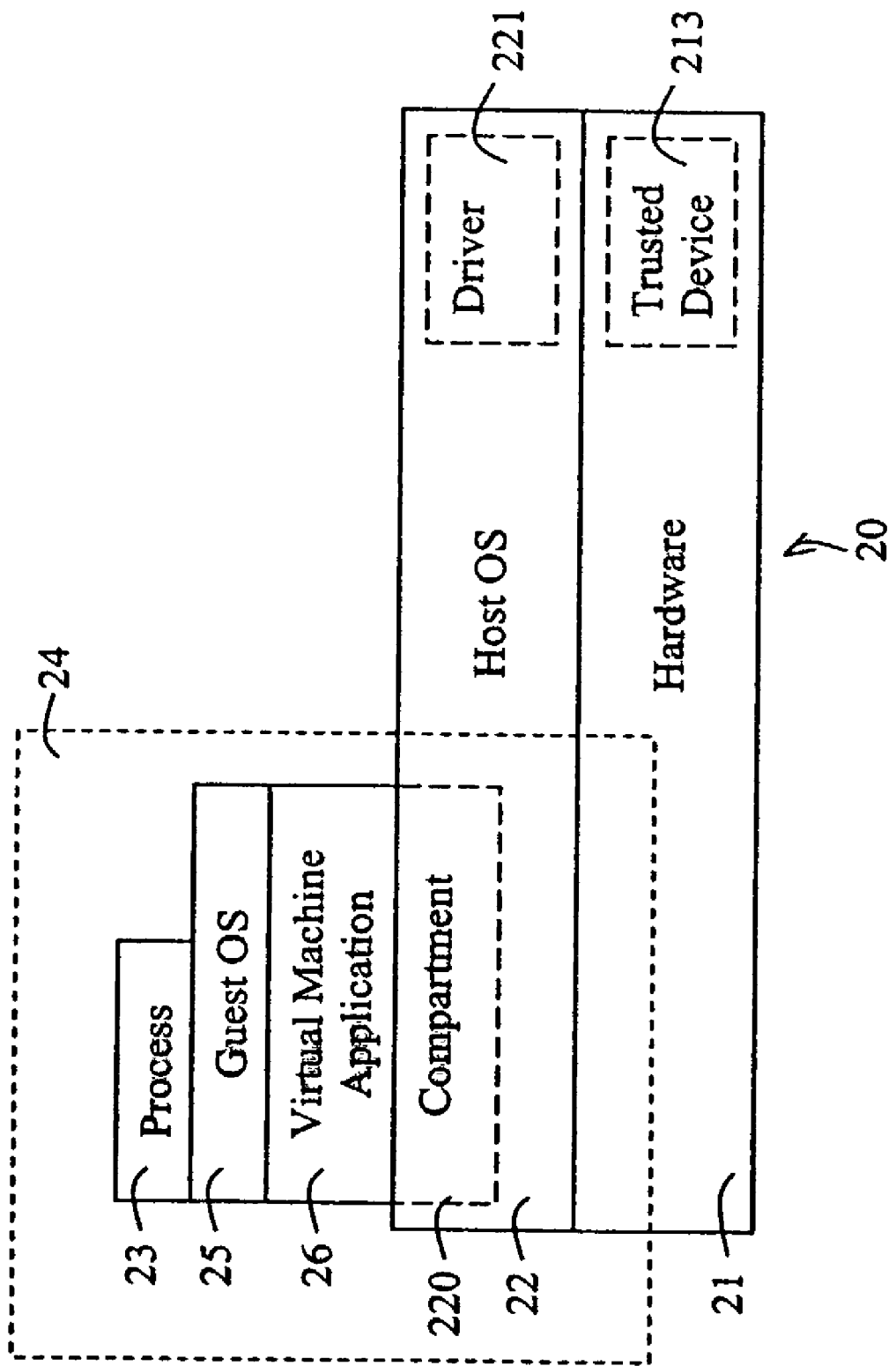
FIG. 2 shows a preferred computing environment.

FIG. 2 shows a logical structure for a preferred computing environment 24 provided by the computing platform for running the process 23.

The process 23 runs on a guest operating system 25. The guest operating system 25 is suitably provided by a virtual machine application 26. The virtual machine application 26 runs on the host operating system 22 and provides an image of a computing platform, or at least appropriate parts thereof. The virtual machine application 26 provides the virtual guest operating system 25 such that, as far as the process 23 is concerned, the process 23 runs on the guest operating system 25 equivalent to running on a host operating system 22. For the purposes of the present invention, the guest operating system 25 is preferably a replica of the host operating system, or at least necessary parts thereof. However, it is equally possible for the virtual machine application 26 to provide a different emulated software or hardware environment, such as a different operating system type or version. An example virtual machine application is sold under the trade mark VMware by VMware, Inc of Palo Alto, Calif., USA.

The virtual machine application 26 assists security by isolating the process 23 from the remainder of the computing platform. Should problems occur during running of the process 23 or as a result thereof, the host operating system 22 can safely shut down the guest operating system 25 provided by the virtual machine application 26. Also, the virtual machine application 26 protects the host operating system 22 and hardware resources 21 from direct access by the process 23. Therefore, it is very difficult for the process 23 to subvert the host operating system 22. Further, the process 23 accesses resources of the computing platform made available through the virtual machine application 26. Each process 23 only sees resources of the computing platform allocated through the virtual machine application 26, such that a process 23 can be restricted to an appropriate share of the resource of the computing platform and cannot stop other processes having their allocated share.

Preferably, the virtual machine application 26 providing the guest operating system 25 runs in a compartment 220 of the host operating system 22. The compartment confines communications and data access of the virtual machine application. The compartment 220 provides secure separation between applications, such that processes are inhibited from communicating with each other, accessing each others status, or interfering with each other, except in accordance with strictly enforced access controls. In particular, a compartment assists the virtual machine application in resisting subversion by a process running in that computing environment.

Referring again to FIG. 2, the process 23 runs in the computing environment 24. It is desired to confirm the integrity of this computing environment. Also, many similar computing environments can be provided on the computing platform simultaneously, and it is desired to confirm the integrity of one selected computing environment independently of the integrity of any other computing environment. That is, it is desired that the multiple computing environments are independently trustworthy. Advantageously, the use of a guest operating system 25, preferably in combination with a compartment 220, provides a high degree of isolation between computing environments, such that the integrity of one computing environment is not affected by activity in any other computing environment.

As described above, the trusted device 213 is arranged to form an integrity metric (or a group of integrity metrics) of the host operating system 22. Also, in the preferred embodiments of the present invention, the trusted device 213 is arranged to obtain an integrity metric (or a group of integrity metrics) for each computing environment 24. Preferably, the trusted device 213 obtains an integrity metric of the guest operating system 25. Further, the trusted device preferably obtains an integrity metric of the virtual machine application 26. Each integrity metric suitably comprises one or more separate integrity metric values.

In the preferred configuration the host operating system 22 has direct access to the trusted device 213. However, to improve security, processes (i.e. applications) running on the host operating system 22 do not have direct access to the trusted device 213. Therefore, a trusted device driver 221 is provided, suitably as part of the host operating system 22. The trusted device driver 221 provides an interface available to applications running on the host operating system 22, including allowing results to be reported to the trusted device 213, and allowing stored integrity metric values to be obtained from the trusted device 213.

Figure 3:
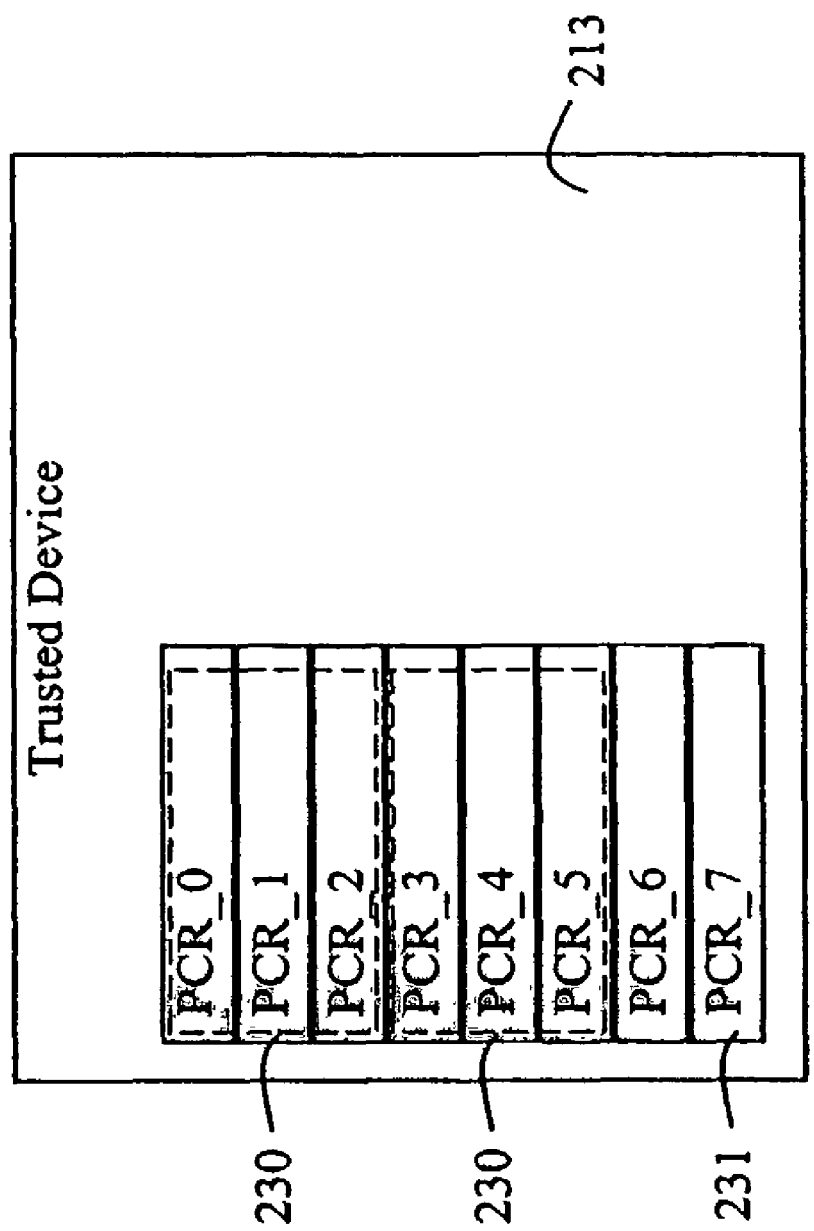
FIG. 3 shows an example trusted device.

FIG. 3 shows a simplified example of the preferred trusted device 213. Amongst other components the trusted device 213 comprises an addressable storage such as a plurality of platform configuration registers (PCRs). In this example eight PCRs are shown, namely PCR_0 to PCR_7 although in practice many more PCRs are available. Suitably, each PCR stores a digest such as a 160 bit hash value representing an integrity metric 231. A group of PCRs form a group of integrity metrics 230. Suitably, the trusted device driver 221 allocates a PCR, or a group of PCRs, to the or each computing environment 24. Therefore, information concerning the integrity of each computing environment is independently available from the trusted device 213.

The stored integrity metric value 231 preferably represents a sequence of integrity metric values obtained, for example, by examination of the host platform 20 periodically or in response to relevant events. The old stored integrity metric value is combined with a new integrity metric value to produce a new updated digest of the sequence of values.

Figure 4:
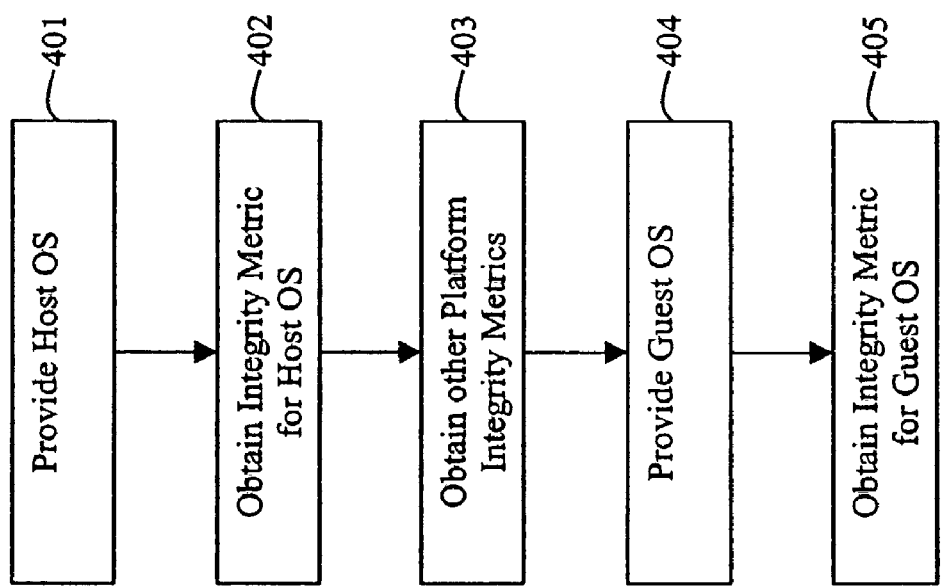
FIG. 4 shows a preferred method for obtaining integrity metrics for multiple trusted computing environments.

FIG. 4 shows a preferred method for obtaining integrity metrics of a computing platform for providing multiple trusted computing environments.

In step 401, the host operating system 22 is provided. Suitably, this includes the steps of starting a BIOS, starting an OS loader, and starting the host operating system as will be familiar to the skilled person.

In step 402, a group of integrity metrics 230 for the host operating system 22 are measured and reported to the trusted device 213. Preferably, the trusted device 213 obtains an integrity metric for the BIOS, and preferably also obtains an integrity metric for the OS loader and the operating system software. Preferably, integrity metric values relevant to the host operating system are stored in a group of PCRs (or other addressable storage) such that the integrity metrics 230 for the host operating system are available later. Steps 401 and 402 are shown separately for clarity. In practical embodiments of the invention it will be appreciated that the integrity metrics 230 are obtained concurrently with providing the host OS 22.

Optionally, at step 403 additional integrity metrics are obtained relevant to other selected elements of the computing platform. For example, the trusted device 213 performs data event logging as described in WO 00/73880 (Hewlett-Packard). Also, the trusted device 213 may produce a digest by applying a hash function to all or selected data files stored on the computing platform, as described in WO 00/73904 (Hewlett-Packard). Preferably, at least some of the integrity metrics obtained in step 402 or step 403 are updated periodically or in response to relevant events to confirm the current integrity status of the host operating system and related components of the computing platform.

In step 404, a guest operating system 25 is provided, to form a new computing environment 24. Suitably, step 404 includes providing a virtual machine application 26 which provides the guest operating system 25.

Preferably, the step 404 includes providing the guest operating system 25 in a compartment 220 of the host operating system 22. Also, the step 404 preferably includes providing a history of all processes (applications) launched in the compartment. Here, it is desired to record whether any other applications have been launched alongside the virtual machine application 26 which provides the guest operating system 25.

In step 405, the trusted device 213 obtains an integrity metric for the computing environment 24. In particular, the trusted device 213 obtains an integrity metric or group of integrity metrics 230 for the guest operating system 25, and preferably the virtual machine application 26. The corresponding integrity metric values 231 are stored in a PCR or group of PCRs allocated to that computing environment. Also, the step 405 preferably includes obtaining an integrity metric for the or each process 23 in the computing environment. Suitably, each integrity metric is obtained by forming a digest (hash value) of program code of a process. As will be familiar to the skilled person, the term integrity metric can refer to a single data item, or can refer to a metric formed from two or more parts each of which themselves can be considered an integrity metric.

Preferably, step 405 is repeated such that a current integrity status of the computing environment is available and history information is updated, periodically or in response to a relevant event.

When it is desired to create or update a stored integrity metric for a particular computing environment, a result is reported to the trusted device driver 221 along with information identifying that particular computing environment, such as an arbitrary label. In one preferred embodiment a process ID of the virtual machine application 26 is used to identify the computing environment. In another embodiment each logical computing environment is supplied with a secret, e.g. a secret is supplied to the virtual machine application 26 by the trusted device driver 221, and then the secret is subsequently used to identify the computing environment. Suitably the computing environment label, such as a secret, is supplied by the host OS 22 when the virtual machine application 26 is launched.

Figure 5:
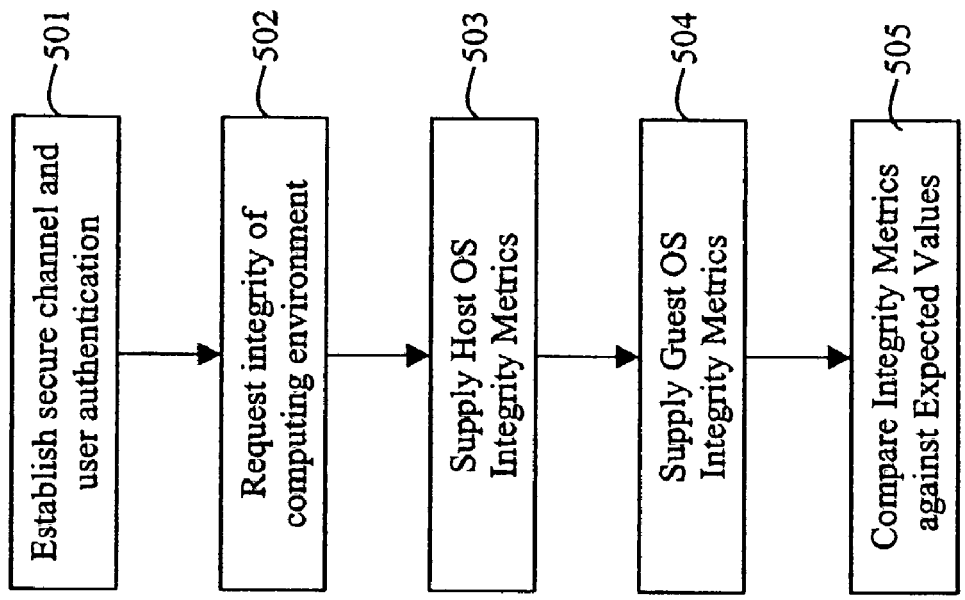
FIG. 5 shows a preferred method for verifying multiple trusted computing environments.

Referring to FIG. 5, a preferred method for verifying a computing environment will now be described.

Optionally, in step 501 a secure channel is established for communicating with the computing platform 20. For a local user 10, a secure channel is provided such as by using a trustworthy user interface and/or by using a token such as a smart card. A remote user 10 establishes a secure channel 30 such as by performing authentication of the computing platform, ideally using a signature from the trusted device 213. Here again, the user optionally employs trusted hardware, such as the user's own client platform, a PDA, mobile phone or other device, optionally in co-operation with a smart card or other token. Preferably, the step 501 includes establishing the authentication and authorisation of the user.

In step 502, the user 10 requests demonstration of the integrity of a computing environment 24. For example, the user 10 issues an integrity challenge. To avoid a re-play attack, the challenge suitably includes a random number sequence (nonce). More detailed background information is provided in "TCPA Specification Version 1.0" published by the Trusted Computing Platform Alliance.

In step 503 the trusted device 213 supplies integrity metrics associated with the host operating system 22. Suitably, these integrity metrics include integrity metrics for the BIOS, operating system loader and host operating system, and integrity metrics formed by periodic or event-driven checks on the host operating system and related components of the computing platform.

In step 504, the trusted device 213 supplies an integrity metric associated with the selected computing environment. Preferably, the step 504 includes supplying integrity metrics associated with the virtual machine application 26, the guest operating system 25, the process 23, and a history of periodic or event-driven checks made on the integrity status of the computing environment 24.

The step 504 preferably includes supplying a history of any applications launched by the host operating system in the same compartment as the guest operating system, i.e. alongside the virtual machine application 26.

Preferably, in step 505 the integrity metric for the host operating system 22 and the computing environment 24 are compared against expected values, such as by using a certificate issued by a trusted party that is prepared to vouch for the integrity of the computing platform. If the comparison is successful, the computing environment is considered to be a trusted computing environment.

Figure 6:
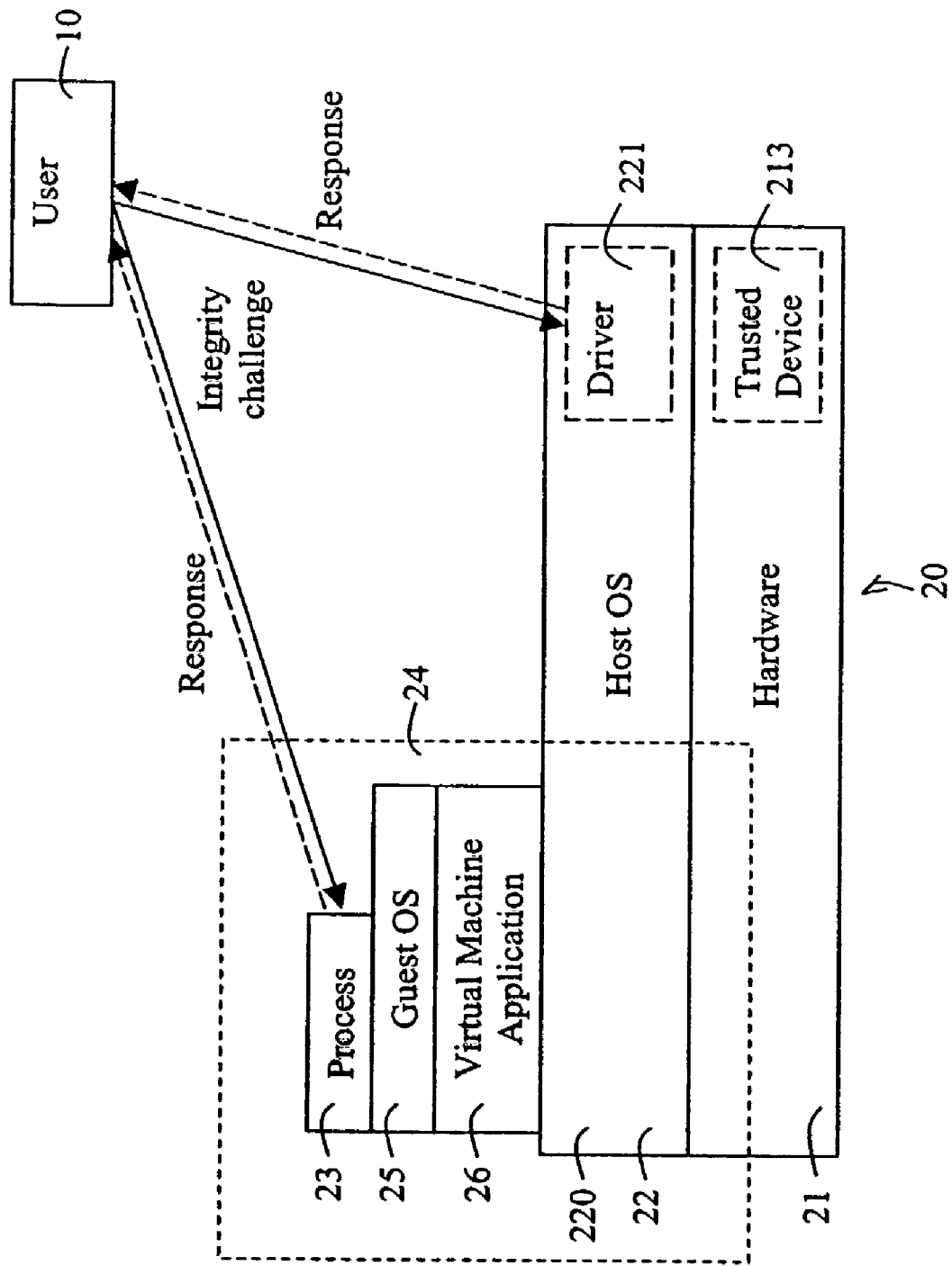
FIG. 6 shows a preferred computing platform communicating with a user.

FIG. 6 shows the preferred computing platform of FIG. 2 communicating with a user 10, to perform the method of FIG. 5. As discussed above in step 502, the user 10 issues a request for verification of the integrity of a computing environment 24, suitably in the form of an integrity challenge.

In a first example, the integrity challenge is issued direct to a component of the host operating system 22, such as the trusted device driver 221. In this embodiment, the integrity challenge includes information previously given to the user 10, such as an arbitrary label, which allows the trusted device driver 221 to establish the relevant computing environment 24. The external computing environment identity label given to the user 10 may be the same as, or complementary to, any information held internally identifying the computing environment. Suitably, the external identity information supplied as part of the integrity challenge is matched against a list of computing environments currently provided on the host operating system, this step ideally being performed by the trusted device driver 221. Suitably, there is a one to one relationship between the compartment identity label as given to the user 10, and any compartment identity label used internally in the host computing platform 20. In step 504 the trusted device 213 supplies an integrity metric or group of integrity metrics 230 associated with the identified computing environment 24.

In a second preferred example, the integrity challenge is issued from the user 10 and is received by a component of the relevant computing environment 24, such as the process 23 which suitably forms part of an application running in that computing environment 24. The integrity challenge is passed from the computing environment 24 to the trusted device driver 221. In this case, the trusted device driver 221 can readily establish the identity of the computing environment 214 passing the integrity challenge. In one example embodiment the computing environment 24 supplies an internal computing environment identity label such as a process ID of the virtual machine application 26, or a secret previously given to the virtual machine application 26 by the host operating system 22. In step 504 the trusted device 213 supplies integrity metrics associated with that computing environment 24.

In a further preferred aspect that can be applied to any of the methods described herein, the guest operating system 25 is itself a compartmented operating system. Multiple applications can be run on the guest operating system 25, each within a separate compartment of the guest operating system. This embodiment enables each computing environment 24 to be subdivided, and the method described above is applied to the subdivided computing environments.

Advantageously, a trusted computing environment is provided by using a trusted device to verify that a guest operating system has booted in a trusted manner. By repeating this process and running multiple guest operating systems, multiple trusted computing environments are provided. A first application can run in a first of the computing environments, whilst a second application can run in a second of the computing environments, where the first and second applications are mutually incompatible or one does not trust the other. The preferred implementation using a virtual machine application in combination with a compartment allows each computing environment to be independently trusted.

It is very difficult for a process running in one computing environment to affect the integrity of any other computing environment. Advantageously, a user can verify the integrity of one computing environment without reference to the integrity of any other computing environment. In the preferred implementation each computing environment has an associated set of one or more integrity metrics which do not include or depend on information about any other computing environment.

The invention claimed is:

1. A method, comprising:
   (a) providing a host operating system;
   (b) obtaining an integrity metric for the host operating system, wherein obtaining the integrity metric includes performing a hash function to all or selected data files associated with the host operating system;
   (c) running a plurality of virtual machine applications on the host operating system;
   (d) running a guest operating system in each of the virtual machine applications; and
   (e) obtaining an integrity metric for each of the virtual machine applications.

2. The method of claim 1, wherein the step (b) includes obtaining the integrity metric during boot of the host operating system.

3. The method of claim 2, wherein the step (b) includes obtaining an integrity metric for a BIOS and/or an OS loader and/or an operating system software of the host operating system.

4. The method of claim 1, wherein the step (b) further includes obtaining the integrity metric by performing data event logging.

5. The method of claim 1, wherein the step (b) comprises updating at least part of the integrity metric for the host operating system.

6. The method of claim 1, wherein the step (e) further comprises obtaining an integrity metric for each of the guest operating systems.

7. The method of claim 1, wherein the step (d) further comprises providing a process running on at least one of the guest operating systems.

8. The method of claim 7, wherein the step (e) further comprises obtaining an integrity metric of the process.

9. The method of claim 1, wherein the step (d) further comprises running the guest operating system in a compartment of the host operating system.

10. The method of claim 9, wherein the host operating system is a compartmented operating system.

11. The method of claim 9, wherein the compartment confines the guest operating system.

12. The method of claim 9, wherein the step (e) further comprises obtaining an integrity metric from a history of all processes launched in the compartment.

13. The method of claim 1, wherein the step (e) further comprises updating at least part of the integrity metric for each of the virtual machine applications.

14. The method of claim 1, wherein the step (b) further comprises storing the integrity metric for the host operating system, and/or the step (e) further comprises storing the integrity metric for each of the virtual machine applications.

15. The method of claim 1, wherein the step (b) and/or the step (e) comprises obtaining the integrity metric using a trusted device.

16. The method of claim 15, comprising storing each integrity metric in a platform configuration register of the trusted device.

17. The method of claim 16, comprising storing the integrity metric for each of the virtual machine applications in a platform configuration register or group of platform configuration registers associated with a computing environment.

18. The method of claim 1, comprising the step of verifying the trusted computing environment including the steps of:
 (f) identifying at least one of virtual machine applications;
 (g) supplying the integrity metric for the host operating system; and
 (h) supplying the integrity metric for the at least one of the virtual machine applications.

19. The method of claim 1, wherein in the step (b), obtaining the integrity metric further includes performing data event logging.

20. The method of claim 1, wherein the integrity metrics are stored in a trusted device.

21. A method for verifying integrity of a plurality of trusted computing environments on a single host computing platform running a host operating system, each computing environment comprising a virtual machine application and a guest operating system running in the virtual machine application, the method comprising:
 (a) identifying the plurality of virtual machine applications;
 (b) supplying integrity metric of the host operating system, wherein at least a portion of the integrity metric corresponds to a result from applying a hash function to all or selected data files associated with the host operating system; and
 (c) supplying integrity metrics associated with the plurality of virtual machine applications.

22. The method of claim 21, further comprising receiving information about a process running in at least one of the virtual machine applications, and determining the virtual machine application which contains that process.

23. A computing platform, comprising:
 a host operating system;
 a plurality of virtual machine applications each comprising a guest operating system running on the host operating system;
 a computing unit including a main processor on which the virtual machine applications run; and
 a trusted device that is separate from the main processor and configured to determine an integrity metric of the host operating system and an integrity metric of each virtual machine application, wherein the trusted device calculates the integrity metric for the host operating system by applying a hash function to all or selected data files associated with the host operating system.

24. The computing platform of claim 23, wherein the trusted device stores the integrity metric for the host operating system and the integrity metric for each guest operating system.

25. The computing platform of claim 24, wherein the trusted device stores each integrity metric in a platform configuration register or a group of platform configuration registers.

26. The computing platform of claim 25, wherein the trusted device allocates a platform configuration register or group of platform configuration registers to each virtual machine application.

27. The computing platform of claim 23, wherein the trusted device further calculates the integrity metric by updating the integrity metric periodically or in response to relevant events to confirm a current integrity status of the host operating system.

28. A method comprising:
 (a) providing a host operating system;
 (b) obtaining and storing an integrity metric for the host operating system, wherein at least a portion of the integrity metric corresponds to a result from applying a hash function to all or selected data files associated with the host operating system;
 (c) providing a plurality of discrete, logically distinct, computing environments each comprising a respective guest operating system running on the host operating system; and
 (d) obtaining and storing an integrity metric for each of the guest operating systems.

* * * * *